June 21, 1966    J. T. ZELLERS, JR    3,257,189
APPARATUS FOR FORMING SHEET GLASS
Filed Sept. 4, 1962    2 Sheets-Sheet 1

INVENTOR.
James T. Zellers, Jr.
BY
Nobbe & Swope
ATTORNEYS

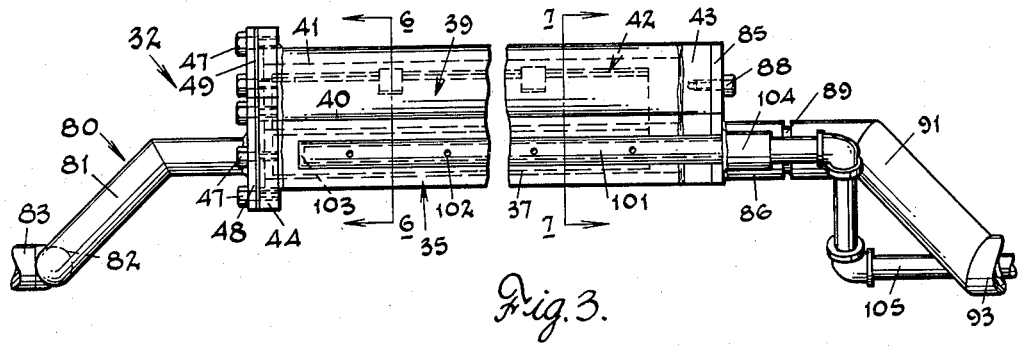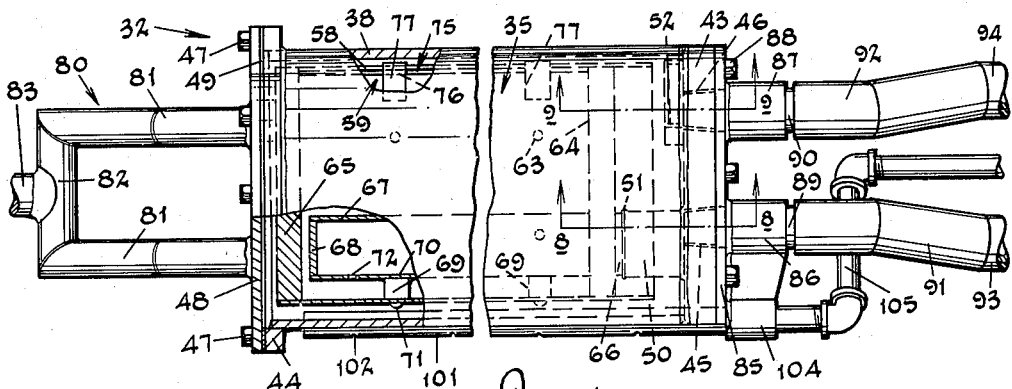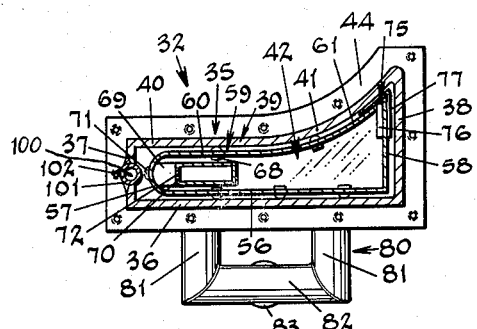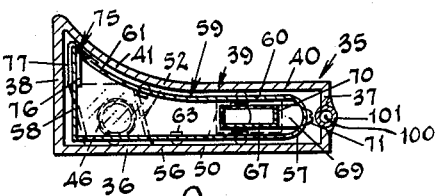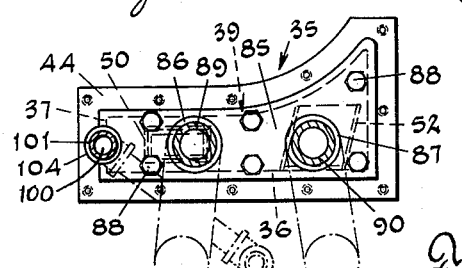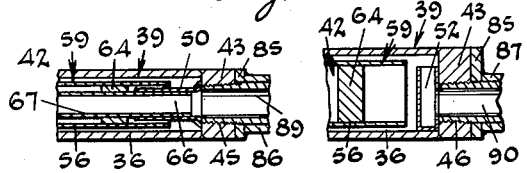

United States Patent Office

3,257,189
Patented June 21, 1966

3,257,189
APPARATUS FOR FORMING SHEET GLASS
James T. Zellers, Jr., Charleston, W. Va., assignor to Libbey-Owens-Ford Glass Company, Toledo, Ohio, a corporation of Ohio
Filed Sept. 4, 1962, Ser. No. 221,076
12 Claims. (Cl. 65—196)

The present invention relates generally to the manufacture of sheet or window glass and, more particularly, relates to an improved heat control member for the roll about which the glass sheet or ribbon travels as it is drawn continuously upwardly from a pool of molten glass.

The terms "sheet" and "window" glass have long been accepted in the art as the descriptive designation of flat glass which is continuously drawn from a pool of molten glass and has fire-polished surfaces attained during its sheet or continuous ribbon formation. According to one known manner of manufacture, the so-called Colburn process, the sheet is drawn upwardly from a pool of molten glass and is then passed about a roll whereby it is bent into a substantially horizontal plane or path along which is moves through a conventional cooling or annealing lehr. The roll about which the sheet is caused to bend from the vertical plane into the horizontal plane is located in the "drawing" chamber of the furnace and normally is adapted to rotate freely with the speed of movement of the drawn glass ribbon. The roll is therefore subjected to the high temperature and the rising air currents present in the drawing chamber and its surface particularly is also subject to direct heat transfer from the glass sheet as it moves in contact therewith.

Now, it is essential that the temperature of the glass sheet, and that of the bending roll, be very accurately controlled since if the sheet and roll are too hot, the sheet will stick to the roll and be damaged, whereas if the roll or sheet are too cold, the bending process cannot be carried out without breaking the sheet. Accordingly, it has heretofore been proposed to locate various heat exchange members or coolers in proximity to the bending roll in an attempt to maintain the latter at a desired working temperature, and while these known coolers have proven somewhat satisfactory, the improved heat exchange unit in accordance with the present invention has been found to supply many important advantages not obtainable with the known structures.

It is, therefore, a principal object of this invention to provide an improved heat control member for the bending roll in the drawing chamber of a sheet glass drawing furnace which includes means for maintaining the surface of the roll at an optimum working temperature.

Another object of the invention is to provide an improved heat control member or so-called cooler having a portion thereof shaped to correspond to the annular surface of the bending roll whereby the temperature of the roll surface may be more uniformly and accurately controlled or influenced by the temperature controlling medium flowing through the cooler.

Another object of the invention is to provide an improved bending roll cooler in which a temperature controlling medium is directed along a circuitous path therein from its point of entry to its exit or exhaust point, with the volume and flow course of the medium through the cooler being made such that predetermined desired temperatures of somewhat varying magnitude may be maintained at different points along the surface of the cooler.

Other objects and advantages of the invention will become more apparent during the course of the following description when read in connection with the accompanying drawings.

In the drawings, wherein like numerals are employed to designate like parts throughout the same:

FIG. 3 is a front elevational view of the cooler;

FIG. 4 is a plan view of the cooler with certain parts thereof broken away and shown in section;

FIG. 5 is a view of one end of the cooler;

FIG. 6 is a transverse, vertical sectional view taken along the line 6—6 of FIG. 3;

FIG. 7 is a transverse, vertical sectional view taken along the line 7—7 of FIG. 3;

FIG. 8 is a longitudinal, vertical sectional view taken along the line 8—8 of FIG. 4;

FIG. 9 is a longitudinal, vertical sectional view taken along the line 9—9 of FIG. 4;

Figure 1:
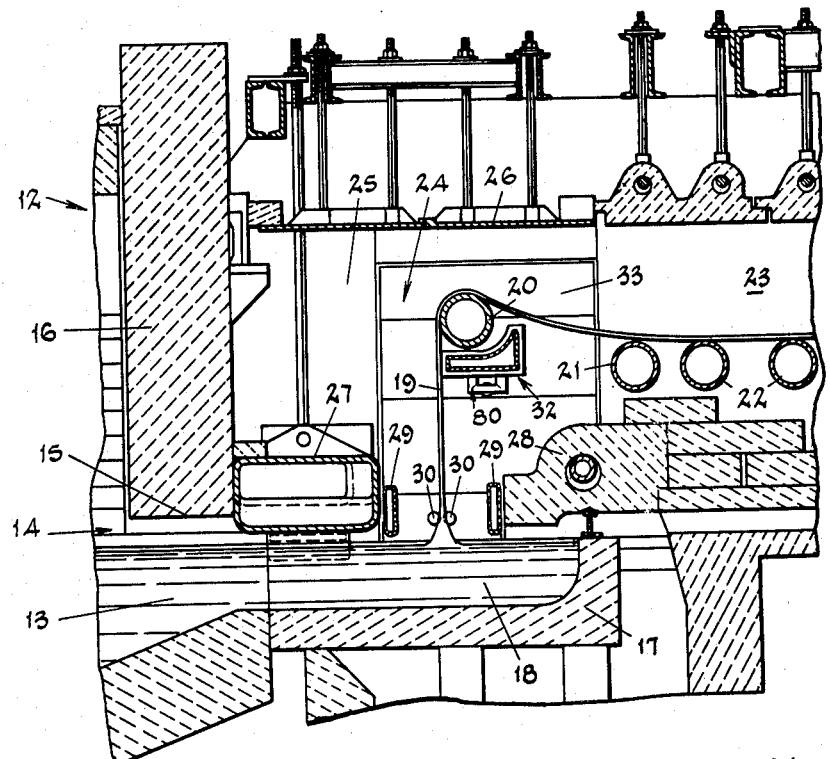
FIG. 1 is a fragmentary, vertical cross sectional view taken along the longitudinal axis of a sheet glass drawing furnace including a bending roll cooler constructed in accordance with this invention.

With reference now to the drawings and particularly FIG. 1 thereof, the numeral 12 designates generally the outlet end of a continuous tank-furnace in which a mass of molten glass is refined and cooled to proper working temperature. The molten glass, indicated by the numeral 13, flows from the cooling chamber 14 beneath the outlet arch 15 of the furnace end wall 16 into a working receptacle or draw-pot 17 to form a relatively shallow pool of molten glass 18 from which a sheet or ribbon 19 is continuously drawn.

Although in no way restricted thereto, the improved temperature controlling member or cooler of the present invention is particularly well adapted for use with the aforementioned Colburn type of sheet glass drawing machine and it will be herein described in that connection. Generally speaking, in drawing machines of this well known character, the sheet or ribbon 19 is continuously drawn upwardly from the surface of the pool of molten glass 18 and, while still in a semi-plastic condition although substantially set in its final sheet form, is deflected into the horizontal plane about a bending roll 20. The sheet then passes over a so-called idler or intermediate roll 21 onto rolls 22 situated in a flattening chamber 23 from which the glass, in either sheet or ribbon form, continues in its forward movement into and through an annealing lehr (not shown).

The bending roll 20 is thus suitably mounted in the forming or drawing chamber, generally designated at 24 and defined by the furnace end wall 16, side walls 25 (one of which is shown), and a roof 26. Also, in glass drawing machines of the aforementioned type, the area of drawing chamber 24 is more or less separated from the draw-pot 17 therebeneath by front and rear lip tiles 27 and 28, respectively, which serve not only to protect the continuous sheet or ribbon 19 during its formation from heat and gases issuing from the cooling chamber 14 and from the area of the draw-pot 17 but also to direct such heat downwardly upon the surface of the pool of molten glass therein to assist in properly conditioning same.

Sheet coolers 29, through which a cooling medium such as water is continuously circulating, are located between the opposed vertical surfaces of the lip tiles 27 and 28 to reduce the temperature of upwardly moving heated air currents and provide a cooling influence for the surfaces of the ribbon 19 as it is drawn upwardly from the pool 18 and passed between oppositely disposed pairs of knurled, width maintaining rolls 30. Additionally, to somewhat insulate the bending roll 20 from the undesirable influence of the rising heated air currents, a cooler member, herein generally designated by the numeral 32, is usually mounted in spaced relation to the roll. For ease of installation and/or adjustment of the bending roll 20, the sheet coolers 29, the knurled rolls 30 and also the bending roll cooler 32, the side walls 25 of the drawing chamber are provided with suitably sized access openings; said openings being more or less tightly sealed by enclosure panels 33.

Now, in accordance with the present invention, the improved bending roll cooler 32, as viewed in FIG. 1, is located beneath the bending roll 20 with one of its surfaces disposed closely adjacent the roll. This surface of the cooler is, moreover, shaped to conform in part to the cylindrical peripheral surface of the roll by the provision of a rearwardly disposed upwardly curving section which is adapted to more completely isolate the roll surface from the heated air currents rising thereabout. This surface also enables a fluid cooling medium, flowing through the cooler, to exert its cooling or temperature reducing effect on a greater surface area of the roll. In addition, the oppositely disposed surface or surfaces of the cooler are positioned to be directly contacted by the hot rising currents so as to reduce the temperature thereof before such currents encounter the exposed surface of the roll.

With more specific reference now to the novel structure of the cooler 32, it will be seen that it includes an elongated, hollow body portion or shell 35 which is defined in part by a substantially horizontally disposed bottom wall 36, a relatively short, forwardly disposed side wall 37 and a higher, rearwardly disposed side wall 38. The purpose for this difference in height dimension between the side walls 37 and 38 is to accommodate the formation of a top wall 39 which includes a forward, generally flat section or portion 40 integrally joined to the side wall 37 and an upwardly and rearwardly curved or arcuate section 41 similarly integral with the upper end of the side wall 38 and merging gently with the flat portion 40.

As viewed in FIG. 1, the cooler 32 is mounted in the chamber 24 such that the flat top wall section 40 underlies and is disposed immediately adjacent the lower surface of the bending roll 20 or that portion of the roll surface just about to move into engagement with the upwardly rising sheet 19; while the curved top wall section 41 extends upwardly in close proximity to the rearwardly disposed side of the roll or that portion of the roll surface just moving out of engagement with the sheet as the latter is deflected or bent into the horizontal plane. In this respect, it is important that the curvature of the arcuate portion 41 of the top wall 39 correspond with or at least be somewhat similar to, i.e. curved in the same direction, the curvature of the peripheral cylindrical roll surface since this permits a fluid cooling medium, such as water, flowing through the shell 35 in a path dictated by an inner shell or manifold 42 as hereinafter fully described, to more directly and intimately influence the working temperature of the roll surface. However, it has also been found highly advantageous that the arcuate portion 41 not be concentric with the bending roll and have a somewhat larger radius of curvature than the latter since this construction enables the interchanging of rolls of varying diameter with relative ease and with only small changes in the space relation therebetween.

The shell 35 is further defined by an end wall 43 and a relatively thick flange or rim 44 and a closure plate 48 at its opposite end. For reasons to be hereinafter more fully set forth, the end wall 43 is provided with drilled and tapped openings 45 and 46 and is preferably secured to the bottom, top and side walls of the shell 35 by welding or like methods to effect a water-tight joint therebetween. The end or closure plate 48, on the other hand, is preferably secured to the flange 44 by screws 47, suitable drilled and tapped bores being provided in the flange for receiving the screws. In this respect, a gasket 49 is interposed between the flange 44 and the plate 48 to render the joint between these surfaces water tight.

A rectangular sleeve 50 is secured to the inner surface of the wall 43 and communicates with the tapped opening 45 although being dimensionally wider than such opening and axially off-set therefrom toward the side wall 37 of the shell. For convenience of assembly, the inner end of the sleeve 50 is flared outwardly as at 51 in FIG. 4. Also, an upwardly open U-shaped partition or baffle 52 is affixed to the inner surface of the wall 43 and the inner or upper surface of the bottom wall 36 in surrounding relationship to the tapped opening 46.

Preparatory to closure of the outer shell 35 by the end plate 48, the manifold or inner shell 42 is inserted therein and supported in generally equally spaced relation to the bottom wall 36, front side wall 37, rear side wall 38 and top wall 39. The manifold 42 consequently substantially conforms in transverse cross section to the cross section of the shell 35 and is formed with a like bottom wall 56, a semi-circular front side wall 57, a rearwardly disposed side wall 58 and a top wall 59 including a flat section 60 and upwardly and rearwardly curving section 61. The bottom wall 56 and top wall 59 are supported in spaced relation to the respective bottom wall 36 and top wall 39 of the shell 35 by means of spherical headed studs or rivets 63 secured in the said walls 56 and 59 in suitable longitudinal and transverse spaced relation to one another.

The inner shell or manifold 42 is closed at its opposite ends by walls 64 and 65 but is not, however, to be considered a closed element since provision is made for the entry and escape of a fluid medium therethrough. In this respect, the wall 64 is formed to initially receive the open end 66 of a rectangular tube or conduit 67 which is closed by a wall 68 at its opposite end. The tube end 66 projects outwardly through the wall 64 and is preferably of suitable dimensions as to be received in slidably interfitting relation with the flared portion 51 of the rectangular sleeve 50 projecting inwardly from the wall 43. The tube 67 is supported in substantially equally spaced relation to the respective bottom wall 56 and top wall 59 of the manifold by the inwardly disposed headed portions 68 of adjacent studs 63 as well as by mounting blocks 69 secured to the front side wall 70 of the tube, facing the curved manifold wall 57, and attached to said wall 57 by means of screws 71. Also a plurality of regularly spaced holes or apertures 72 are provided in the wall 70 as can be best seen in FIGS. 4 and 10.

The proximate edges of the rear wall 58 and the curved section 61 of the manifold top wall 59 are disposed in spaced relation to form an elongated slot or opening 75 (FIGS. 4, 6 and 11), extending between the end walls 64 and 65. These edges of the walls 58 and 59 are firmly supported in this spaced relation by means of plates 76 affixed to the inner marginal surface of the wall 58, and the proximate edge of the top wall 59 is held in abutting relation thereagainst by straps 77 placed in overlapping relation on the outer surfaces of the walls.

With the manifold 42 properly positioned within the outer shell 35 of the heat exchanger or roll cooler 32, the aforementioned closure plate 48 is secured to the rim by the several screws 47. While serving to close the end of the shell 35, the plate 48 is additionally provided with a fork-shaped mounting member 80, such member being formed by bent leg portions 81 attached to the plate 48 and integral with a web 82, and a mounting leg portion 83 projecting outwardly from the medial area of the web 82. While not herein disclosed in detail, it is to be understood that the leg portion 83 is extended through one of the enclosure panels 33 of the furnace side walls 25 and is rigidly mounted outwardly thereof on a portion of the furnace frame structure.

At its opposite end, the cooler 32 is supported by piping connections which are also adapted to deliver and exhaust the temperature controlling fluid medium circulated through the cooler. For this purpose, a mounting plate 85, equipped with tubular fittings 86 and 87 is secured to the outer surface of the shell wall 43 by screws 88. The fittings 86 and 87 are located so as to align with the tapped openings 45 and 46 in the wall 43 thereby permitting the threading of pipes 89 and 90 into the wall. The pipes 89 and 90 are enclosed by suitable insulation sleeves 91 and 92 and are bent to form outwardly directed mounting portions 93 and 94 disposed substantially in a horizontal plane including the axis of the mounting leg portion 83 of the mounting member 80 at the opposite end of the shell 35.

It will thus be apparent that with the improved heat exchanger or cooler in accordance with this invention supported within the drawing chamber 24 and arranged in suitably spaced relation to the adjacent cylindrical peripheral surface of the bending roll 20, a particularly effective structure for modulating the temperature of such bending roll is provided. Thus, in use, a temperature controlling or coolant medium, such as water, is introduced by pipe 89 through the sleeve 50 into the tube or conduit 67 which permits a regulated predetermined amount of the coolant water to flow, as indicated by the arrows $a$ (FIG. 10), into the manifold 42 by way of the several holes or apertures 72. Upon suitable filling of the tube 67, and eventually the manifold with the coolant, such coolant passes outwardly, as indicated by the arrows $b$ (FIG. 11), through the elongated slot 75 into the passageway between the outer shell 35 and the manifold. Because the entry of the coolant into the manifold or inner shell 42 from the tube 67 and the subsequent exhaust thereof into the shell 35 is to some extent metered by the plurality of apertures 72 as well as the area defined by the elongated slot 75, the temperature of the coolant will be gradually raised until it is within the range desired for regulating the temperature of the several walls of the outer shell, either to influence the temperature of the atmosphere about the bending roll surface or, in having its temperature raised by the heat of such atmosphere, to absorb and dissipate the heat by further movement of the coolant through the shell and outward flow through the partition 52 and pipe 90. In this connection, since the height of the baffle 52 is substantially the same as the distance between the bottom wall 36 of the outer shell 35 and the flat section 40 of the top wall 39, it will be understood that practically the entire interior of the shell 35 will become filled with the coolant and the temperature of the walls of the shell properly influenced to the degree desired thereby before the heated coolant will have risen to a height sufficient that it is exhausted from the shell 35, or the cooler 32 itself. Further, it will be appreciated that with the number and size of the openings 72 in the tube 67 and the area of the slot 75 in the manifold 42 predeterminedly controlling the rate of coolant flow according to the regulated pressure thereof, the actual volume of coolant present in the shell 35 can be suitably maintained by control of the rate of discharge thereof into and through the pipe 90 by means of suitable valving.

It has additionally been found that due to the novel construction of the outer shell 35 of the cooler or heat exchanger 32 as well as its location with reference to the bending roll 20, the cooler can be employed to further advantage in the improvement of the surface quality of the glass sheet or ribbon. Thus, the existence of surface imperfections or defects in the ribbon has been, for one reason or another, attributed to the surface of the bending roll which of course contacts the undersurface of the newly-formed glass ribbon. The absence or existence of such imperfections has also been found to vary during the length of time one roll is in use. One known manner of reducing, if not completely eliminating, marring of the glass surface is to provide a protective layer on the surface of the bending roll and to continuously replenish the layer as it is worn from the roll. This has been accomplished by introducing a gas into the drawing chamber and directing it against the surface of the rising ribbon as it approaches the bending roll. The gas, which by way of example may be sulphur trioxide ($SO_3$), combines with the glass surface layer and produces sodium sulfate ($Na_2SO_4$). This results in a soft, white film on the undersurface of the glass which is carried onto the surface of the bending roll and serves as a parting agent or lubricant over which the surface of the glass ribbon can move without being marred by the otherwise unprotected surface of the roll.

To adapt the improved cooler for performing this additional filming function, the front wall 37 of the outer shell 35 is provided with a hollow tubular chamber 100 formed by a pipe member 101 sealed into the wall. The pipe 101 is substantially coextensive with the length of the wall 37 and is provided with openings or apertures 102 in its outwardly directed surface. The end of the pipe facing the flange 44 is closed by a wall 103 while the opposite end thereof is supported on the plate 85 by means of a tubular fitting 104. Outwardly of the plate 85, the projecting end of the pipe is conventionally connected to a supply pipe 105 which, for practical mounting purposes, is disposed midway between the previously mentioned pipes 93 and 94. Thus, during active use of the bending roll, the desired gas can be directed from the chamber 100 through openings 102 toward the adjacent surface of the glass ribbon 22. This combined utility of the cooler 32 also permits the cooling medium flowing through the shell 35 to contact the inner wall of the pipe 101 and cool the same to maintain the gas flowing therethrough at a desired working temperature.

Figures 2, 10, 11:
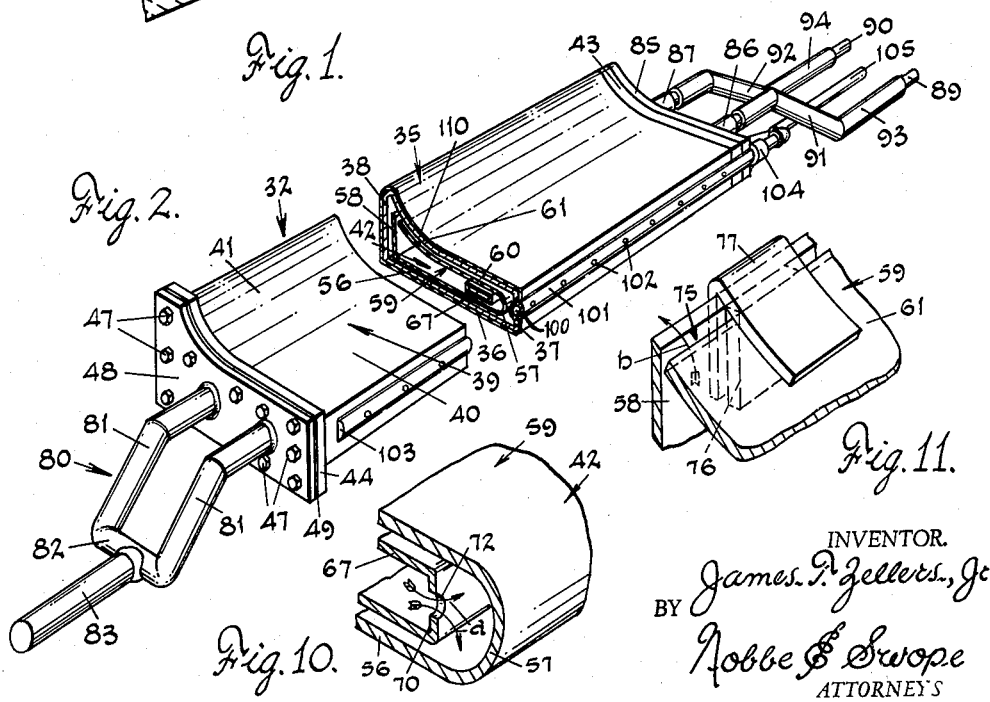
FIG. 2 is a broken, perspective view of the cooler.
FIG. 10 is a fragmentary, perspective detail view of a portion of the cooler.
FIG. 11 is a fragmentary, perspective view showing in detail the construction of a further portion of the cooler.

It has also been found desirable to render the exterior of the cooler more receptive to the absorption of heat. This is accomplished, as shown in FIG. 2, by the provision of a layer of a heat resistant material 110 having a dark color which is applied, as by brushing or spraying, on the outer surfaces of the shell 35.

It is to be understood that the form of the invention herewith shown and described is to be taken as a preferred embodiment of the same, and that various changes in the shape, size and arrangement of parts may be resorted to without departing from the spirit of the invention.

I claim:

1. In apparatus for producing sheet glass, a working receptacle in which a molten glass bath is maintained, a forming chamber above said working receptacle, means for drawing a continuous ribbon of glass upwardly from said molten bath through said forming chamber, at least one rotatable roll positioned in said chamber and having a cylindrical peripheral surface for engaging the glass ribbon and deflecting said ribbon from one plane to another, and temperature control means mounted between said bath and said roll comprising an elongated hollow outer shell defined by a bottom wall, top wall, longitudinally extending side walls and transverse end walls, one of said side walls being of greater height than the other, said top wall joining and extending between the uppermost portions of said side walls and including a generally flat portion adjacent the shorter of said side walls and underlying said roll and an integral arcuate portion adjacent the taller side wall extending upwardly from said flat portion in close proximity to one side of said roll, an inner hollow shell disposed within said outer shell in spaced relation thereto to provide a passageway between the respective shells, and means providing communication between the interior of said inner shell and said passageway adjacent the juncture of said outer shell top wall and the taller of said side walls.

2. Apparatus in accordance with claim 1, wherein said hollow outer shell includes a substantially flat bottom surface facing and disposed horizontally above the surface of said bath.

3. Apparatus in accordance with claim 1, wherein said ribbon is deflected by said roll from a vertical plane into a substantially horizontal plane, and said outer arcuate portion of said shell extends upwardly adjacent the deflected portion of said ribbon.

4. A sheet glass bending roll cooler comprising an elongated hollow outer shell defined by a bottom wall, top wall, longitudinally extending side walls and transverse end walls, one of said side walls being of greater height than the other, said top wall joining and extending between the uppermost portions of said side walls and including a generally flat portion adjacent the shorter of said side walls and an arcuate portion adjacent the taller side wall and gently merging with said flat portion, and an inner hollow shell disposed within said outer shell in spaced relation thereto to provide a passageway between the respective shells, the interior of said inner shell communicating with said passageway through an elongated slot formed in said inner shell adjacent the juncture of said outer shell top wall and the taller of said side walls.

5. A sheet glass bending roll cooler comprising an elongated hollow outer shell defined by a bottom wall, top wall, longitudinally extending side walls and transverse end walls, one of said side walls being of greater height than the other, said top wall joining and extending between the uppermost portions of said side walls and including a generally flat portion adjacent the shorter of said side walls and an arcuate portion adjacent the taller side wall and gently merging with said flat portion, an inner hollow shell disposed within said outer shell in spaced relation thereto to provide a passageway between the respective shells, means providing communications between the interior of said inner shell and said passageway, and a tubular conduit extending longitudinally through the hollow interior of said inner shell and including means providing communication between the interior of said conduit and said inner shell.

6. A sheet glass bending roll cooler comprising an elongated hollow outer shell defined by a bottom wall, top wall, longitudinally extending side walls and transverse end walls, one of said side walls being of greater height than the other, said top wall joining and extending between the uppermost portions of said side walls and including a generally flat portion adjacent the shorter of said side walls and an arcuate portion adjacent the taller side wall and gently merging with said flat portion, an inner hollow shell having an outline smaller than but substantially geometrically similar to said outer shell mounted within said outer shell to provide a passageway therebetween, an elongated slot in said inner shell providing communication between the interior of said inner shell and said passageway adjacent the juncture of said outer shell top wall and the taller of said side walls, and a tubular conduit extending longitudinally through the hollow interior of said inner shell beneath the flat portion of said outer shell top wall, said conduit having a plurality of apertures formed therein and spaced along the length thereof providing communication between the interiors of said conduit and said inner shell.

7. Apparatus in accordance with claim 6, including inlet means communicating with said conduit for delivering a fluid cooling medium to said cooler.

8. Apparatus in accordance with claim 6, including outlet means communicating with said passageway for exhausting a fluid cooling medium from said cooler.

9. Apparatus in accordance with claim 8, including baffle means surrounding said outlet means and opening into said passageway adjacent the juncture of said outer shell top wall and the taller of said side walls.

10. Apparatus in accordance with claim 9, wherein said baffle means open into said passageway at a height approximately equal to the height of the shorter of said outer shell side walls.

11. Apparatus in accordance with claim 6, including a pipe extending longitudinally of the cooler and mounted in the shorter of said outer shell side walls, said pipe having a plurality of apertures formed therein spaced along its length and opening outwardly of said cooler and means for introducing a gas into the interior of said pipe.

12. Apparatus in accordance with claim 1, including a tubular conduit extending longitudinally through the hollow interior of said inner shell, said conduit having a plurality of apertures formed therein and spaced along the length thereof providing communication between the interiors of said conduit and said inner shell, inlet means communicating with said conduit for delivering a fluid cooling medium to said cooler, and outlet means communicating with said passageway for exhausting said fluid cooling means from said cooler.

References Cited by the Examiner
UNITED STATES PATENTS

| | | | |
|---|---|---|---|
| 1,547,797 | 7/1925 | Ewing | 65—26 |
| 1,610,004 | 12/1926 | Grolemund | 65—196 |

DONALL H. SYLVESTER, *Primary Examiner.*

D. CRUPAIN, *Assistant Examiner.*